(12) United States Patent
Deker et al.

(10) Patent No.: US 8,306,677 B2
(45) Date of Patent: Nov. 6, 2012

(54) AUTOMATIC TURBULENCE DETECTION METHOD

(76) Inventors: Guy Deker, Cugnaux (FR); Jérôme Sacle, Toulouse (FR); François Coulmeau, Seilh (FR)

( * ) Notice: Subject to any disclaimer, the term of this patent is extended or adjusted under 35 U.S.C. 154(b) by 1212 days.

(21) Appl. No.: 11/942,240

(22) Filed: Nov. 19, 2007

(65) Prior Publication Data
US 2008/0119971 A1    May 22, 2008

(30) Foreign Application Priority Data
Nov. 21, 2006   (FR) ..................... 06 10174

(51) Int. Cl.
*G08B 21/00* (2006.01)
*B64D 45/00* (2006.01)
(52) U.S. Cl. ............ 701/9; 701/14; 340/968; 340/964
(58) Field of Classification Search ........................ 701/9
See application file for complete search history.

(56) References Cited

U.S. PATENT DOCUMENTS

| | | | |
|---|---|---|---|
| 3,427,581 A * | 2/1969 | Hartman | 340/968 |
| 3,436,035 A * | 4/1969 | Priestley | 244/193 |
| 4,585,341 A * | 4/1986 | Woodfield | 356/28.5 |
| 5,657,009 A | 8/1997 | Gordon | |
| 6,177,888 B1 * | 1/2001 | Cabot et al. | 340/968 |
| 6,388,608 B1 * | 5/2002 | Woodell et al. | 342/26 R |
| 6,456,226 B1 * | 9/2002 | Zheng et al. | 342/26 R |
| 6,505,508 B1 * | 1/2003 | Kameyama et al. | 73/147 |
| 6,539,291 B1 * | 3/2003 | Tanaka et al. | 701/9 |
| 2003/0009268 A1 * | 1/2003 | Inokuchi | 701/14 |

OTHER PUBLICATIONS

The RTCA Special Committee 186, "Minimum Aviation System Performance Standards for Automatic Dependent Surveillance Broadcast (ADS-B)", RTCA DO242A, RTCA Inc., 1828 L Street NW, Suite 805, Washington, DC 20036, USA, Jun. 25, 2002.
The RTCA Special Committee 195, Minimum Interoperability Standards (MIS) for Automated Meteorological Transmission (AUTOMET), RTCA DO252, RTCA Inc., 1828 L Street NW, Suite 805, Washington, DC 20036 USA, Jan. 11, 2000.

* cited by examiner

*Primary Examiner* — Shelley Chen
(74) *Attorney, Agent, or Firm* — Lowe, Hauptman, Ham & Berner

(57) ABSTRACT

The invention relates to a method for automatic detection of turbulence by a second aircraft, by information exchange between the second aircraft and at least a first aircraft. The first aircraft has means for transmitting information and the second aircraft has means for receiving the information transmitted by the first aircraft. The method includes the identification of information about turbulence liable to be encountered by the second aircraft, by analyzing the information received from the first aircraft. An alarm is activated on the basis of the turbulence information.

20 Claims, 2 Drawing Sheets

AUTOMATIC TURBULENCE DETECTION METHOD

RELATED APPLICATIONS

The present application is based on, and claims priority from, France Application Number 06 10174, filed Nov. 21, 2006, the disclosure of which is hereby incorporated by reference herein in its entirety.

TECHNICAL FIELD

The invention relates to systems for the detection of changes in environment coupled to flight management and control systems, and more particularly for automatic turbulence detection.

BACKGROUND OF THE INVENTION

Flight safety is the number one priority of airlines, followed by in-flight comfort and flight operating cost. Incidents may occur when turbulence is experienced in flight. The consequences range from simple discomfort to loss of control of the aircraft. The detection of these phenomena is therefore a key problem.

The turbulence may be of various origins: wake turbulence, convective turbulence, clear air turbulence (or CAT) and windshear.

Wake turbulence, comprising wake vortices, is dreaded when a lighter aircraft than its predecessor becomes too close to it and when the wind does not rapidly dissipate these "wind vortices". This happens particularly during take-off and landing, because the runway enhances the hazardous effects.

Convective turbulence is associated with shear between descending and ascending movements in cumulous-type cloud masses passed through, such as cumulo nimbus and tower cumulous clouds. Convective turbulence is localized (in and beneath clouds), and sometimes is difficult to predict. However, depending on the meteorological context, it may be anticipated, and then, in anticipation, the appropriate speed is applied.

Clear air turbulence is due to the energy of the mean wind flux at high altitude, or to the transition between two masses of air moving at different speeds, such as on approaching jet streams. Jet streams are wind currents of small thickness but with an average width of a few tens of kilometers, flowing at high speed around the earth at high altitude. In general encountered at cruise altitudes, clear air turbulence is the most hazardous as it cannot be detected. It sometimes happens that persons not wearing safety belts, such as CFC (Commercial Flight Crew) are seriously injured.

Windshear is due to sudden variations or inversions of wind encountered on approaching certain airports in certain weather conditions, or else rapid variations encountered on approaching or penetrating jet streams. This type of turbulence induces wind gradients which may quite simply make the aircraft stall.

It is crucial to detect turbulence as soon as possible in order to apply the appropriate safety rules. In particular, it is often necessary to reduce the speed of the aircraft to what is called a turbulence speed, so as, on the one hand, to reduce the vibrations of the airplane that are not noticed by the passengers and, on the other hand, to prevent any weakening or sometimes fracture of a structure.

A first solution for detecting turbulence consists in using conventional weather radars. However, this solution has the drawback of detecting only storms and cumulonimbus clouds, but not the other phenomena that do not reflect the radar echoes or do so poorly.

A second solution is to use radars based on infrared techniques or Lidar, enabling certain invisible phenomena to be detected. The drawback is that detection is effected only at very short term.

Another solution for the pilot consists in listening to any radio information coming from preceding airplanes. This solution does make it possible to anticipate turbulence sufficiently early to adopt the speed and flight path that are appropriate. However, this solution relies entirely on the pilot and it increases his workload.

The object of the invention is to alleviate the abovementioned problems by proposing a means which is more rapid, easier and more stable for receiving and processing information coming from preceding aircraft and also allows the pilot to be warned when turbulence is on the point of being encountered.

SUMMARY OF THE INVENTION

For this purpose, one subject of the invention is a method for automatic detection of turbulence by a second aircraft, by information exchange between the second aircraft and at least a first aircraft, the first aircraft having means for transmitting information and the second aircraft having means for receiving said information transmitted by the first aircraft, which method includes:
  the identification of information about turbulence liable to be encountered by the second aircraft, by analyzing the information received from the first aircraft; and
  the activation of an alarm on the basis of said turbulence information.

Advantageously, the automatic turbulence detection method according to the invention includes the following steps:
  the transmission by at least a first aircraft of information about its position and its speed;
  the reception of said information by a second aircraft;
  the measurement by the second aircraft of the variation in speed of the first aircraft ($\Delta$); and,
  the comparison with a maximum speed variation threshold ($\Delta_{max}$) and, if the threshold is exceeded, the activation of an alarm proportional to the speed variation ($\Delta$).

Advantageously, the second aircraft analyzes the horizontal speed of the first aircraft in order to detect turbulence.

Advantageously, the second aircraft analyzes the vertical speed of the first aircraft in order to detect turbulence.

Advantageously, the second aircraft analyzes the horizontal and vertical speed of the first aircraft in order to detect turbulence.

Advantageously, the automatic turbulence detection method according to the invention, comprising the calculation of a first horizontal speed difference ($\Delta V_i$) in absolute value on the basis of a first horizontal speed measurement ($V_i$) taken at a first time ($t_i$) and of a second horizontal speed measurement ($V_{i+1}$) taken at a second time ($t_{i+1}$), is noteworthy in that the alarm is activated after confirmation of said measurements, which comprises the following steps:
  the initiation of at least a third horizontal speed measurement ($V_{i+2}$) at a third time ($t_{i+2}$);
  the calculation of at least a second speed difference ($\Delta V_i'$) in absolute value on the basis of the first horizontal speed measurement ($V_i$) taken at the first time ($t_i$) and of the third horizontal speed measurement ($V_{i+2}$) at the third time ($t_{i+2}$), the comparison of the horizontal speed differences in absolute value with a threshold ($\Delta V_{max}$); and, if all the horizontal speed differences in absolute value are above the threshold ($\Delta V_{max}$), the activation of said alarm.

Advantageously, the automatic turbulence detection method according to the invention, comprising the calculation of a first vertical speed difference ($\Delta Vz_i$) in absolute value on the basis of a first vertical speed measurement ($Vz_i$) taken at a first time ($t_i$) and of a second vertical speed measurement ($Vz_{i+1}$) taken at a second time ($t_{i+1}$), is noteworthy in that the alarm is activated after confirmation of said measurements, which comprises the following steps:

the initiation of at least a third vertical speed measurement ($Vz_{i+2}$) at a third time ($t_{i+2}$);

the calculation of at least a second vertical speed difference ($\Delta Vz_i'$) in absolute value on the basis of the first vertical speed measurement ($Vz_i$) taken at the first time ($t_i$) and of the third vertical speed measurement ($Vz_{i+2}$) at the third time ($t_{i+2}$), the comparison of the vertical speed differences in absolute value with a threshold ($\Delta Vz_{max}$); and, if all the vertical speed differences ($\Delta Vz_i'$) in absolute value are above the threshold ($\Delta Vz_{max}$), the activation of said alarm.

Advantageously, the automatic turbulence detection method according to the invention, comprising the calculation of a first rms speed difference ($\Delta Vq_i$) from a first measurement of the horizontal speed ($V_i$) and vertical speed ($Vz_i$) taken at a first time ($t_i$) and from a second measurement of the horizontal speed ($V_{i+1}$) and vertical speed ($Vz_{i+1}$) taken at a second time ($t_{i+1}$), is noteworthy in that the alarm is activated after confirmation of said measurements, which comprises the following steps:

the calculation of the first rms speed difference ($\Delta Vq_i$), said first rms difference satisfying the following equation:

$$\Delta Vq_i = \sqrt{(V_{i+1}-V_i)^2 + (Vz_{i+1}-Vz_i)^2},$$

the initiation of at least a third measurement of the horizontal speed ($V_{i+2}$) and vertical speed ($Vz_{i+2}$) at a third time ($t_{i+2}$);

the calculation of at least a second rms speed difference ($\Delta Vq_i'$) from the first measurement of the horizontal speed ($V_i$) and vertical speed ($Vz_i$) taken at the first time ($t_i$) and from the third measurement of the horizontal speed ($V_{i+2}$) and vertical speed ($Vz_{i+2}$) at the third time ($t_{i+2}$), said second rms difference satisfying the following equation:

$$\Delta Vq_i' = \sqrt{(V_{i+2}-V_i)^2 + (Vz_{i+2}-Vz_i)^2},$$

the comparison of the rms speed differences with a threshold ($\Delta Vq_{max}$); and if the rms speed differences are above the threshold ($\Delta Vq_{max}$), the activation of said alarm.

Advantageously, the automatic turbulence detection method according to the invention, which comprises the calculation of a first horizontal acceleration difference ($\gamma_i$) from a first horizontal speed measurement ($V_i$) taken at a first time ($t_i$) and from a second horizontal speed measurement ($V_{i+1}$) taken at a second time ($t_{i+1}$), is noteworthy in that the alarm is activated after confirmation of said measurements, which comprises the following steps:

the calculation of the first horizontal acceleration difference ($\gamma_i$), said first difference satisfying the following equation:

$$\gamma_i = (V_{i+1}-V_i)/(t_{i+1}-t_i),$$

the initiation of at least a third horizontal speed measurement ($V_{i+2}$) at a third time ($t_{i+2}$);

the calculation of at least a second horizontal acceleration difference ($\gamma_i'$) from the first horizontal speed measurement ($V_i$) taken at the first time ($t_i$) and from the third horizontal speed measurement ($V_{i+2}$) at the third time ($t_{i+2}$), said second difference satisfying the following equation:

$$\gamma_i' = (V_{i+2}-V_i)/(t_{i+2}-t_i),$$

the comparison of the horizontal acceleration differences with an acceleration threshold ($\gamma_{max}$); and, if the horizontal acceleration differences are above the acceleration threshold ($\gamma_{max}$), the activation of said alarm.

Advantageously, the automatic turbulence detection method according to the invention, which comprises the calculation of a first vertical acceleration difference ($\gamma_i$) from a first vertical speed measurement ($Vz_i$) taken at a first time ($t_i$) and from a second vertical speed measurement ($Vz_{i+1}$) taken at a second time ($t_{i+1}$), is noteworthy in that the alarm is activated after confirmation of said measurements, which comprises the following steps:

the calculation of the first vertical acceleration difference ($\gamma_i$), said first difference satisfying the following equation:

$$\gamma_i = (Vz_{i+1}-Vz_i)/(t_{i+1}-t_i),$$

the initiation of at least a third vertical speed measurement ($Vz_{i+2}$) at a third time ($t_{i+2}$);

the calculation of at least a second vertical acceleration difference ($\gamma_i'$) from the first vertical speed measurement ($Vz_i$) taken at the first time ($t_i$) and from the third vertical speed measurement ($Vz_{i+2}$) at the third time ($t_{i+2}$), said second difference satisfying the following equation:

$$\gamma_i' = (Vz_{i+2}-Vz_i)/(t_{i+2}-t_i),$$

the comparison of the vertical acceleration differences with an acceleration threshold ($\gamma_{max}$); and, if the vertical acceleration differences are above the acceleration threshold ($\gamma_{max}$), the activation of said alarm.

Advantageously, the automatic turbulence detection method according to the invention, which comprises the calculation of a first rms acceleration difference ($\gamma q_i$) from a first measurement of the horizontal speed ($V_i$) and vertical speed ($Vz_i$) taken at a first time ($t_i$) and from a second measurement of the horizontal speed ($V_{i+1}$) and vertical speed ($Vz_{i+1}$) taken at a second time ($t_{i+1}$), is noteworthy in that the alarm is activated after confirmation of said measurements, which comprises the following steps:

the calculation of the first rms acceleration difference ($\gamma q_i$), said first rms acceleration difference satisfying the following equation:

$$\gamma q_i = \frac{\sqrt{(V_{i+1}-V_i)^2 + (Vz_{i+1}-Vz_i)^2}}{(t_{i+1}-t_i),},$$

the initiation of at least a third measurement of the horizontal speed ($V_{i+2}$) and vertical speed ($Vz_{i+2}$) at a third time ($t_{i+2}$);

the calculation of at least a second rms acceleration difference ($\gamma q_i'$) from the first measurement of the horizontal speed ($V_i$) and vertical speed ($Vz_i$) taken at the first time ($t_i$) and from the third measurement of the horizontal speed ($V_{i+2}$) and vertical speed ($Vz_{i+2}$) at the third time ($t_{i+2}$), said second rms acceleration difference satisfying the following equation:

$$\gamma q'_i = \frac{\sqrt{(V_{i+2} - V_i)^2 + (Vz_{i+2} - Vz_i)^2}}{(t_{i+2} - t_i)},$$

the comparison of the rms acceleration differences with a threshold ($\gamma q_{max}$), and
if the rms acceleration differences are above the threshold ($\gamma q_{max}$), the activation of said alarm Advantageously, the automatic turbulence detection method according to the invention furthermore includes a step of inhibiting the alarm.

Advantageously, the step of inhibiting the alarm is initiated if the airplane is already in a flight configuration appropriate to flight under turbulent conditions.

Advantageously, the step of inhibiting the alarm is initiated manually by the pilot.

Advantageously, the automatic turbulence detection method according to the invention comprises the following steps:
the acquisition of information about turbulence detected or encountered by the first aircraft;
the transmission of said information by the first aircraft;
the reception of this information by a second aircraft; and
the activation of an alarm by the second aircraft corresponding to said turbulence.

Advantageously, the transmission of information about turbulence by a first aircraft is carried out automatically.

Advantageously, the transmission of information about turbulence by a first aircraft is initiated manually by the pilot of said first aircraft.

Advantageously, the alarm includes information about the expected time of encountering the turbulence detected and about its intensity.

Advantageously, the automatic turbulence detection method is noteworthy in that the information transmitted from the first aircraft to the second aircraft includes the position, altitude and path of the first aircraft and in that it furthermore includes a step of analyzing said information by the second aircraft in order to determine whether the latter is liable to encounter the turbulence signaled by the first aircraft and to reject the turbulence information coming from the first aircraft if the latter lies beyond the short-term horizon of the second aircraft.

Another subject of the invention is an automatic turbulence detection device having acquisition means, analysis means, alarm means and a man-machine interface which includes a display means and control knobs placed on either side of said display means, which device is noteworthy in that said man-machine interface includes means for signaling that turbulence has been detected.

Advantageously, the transmission system of the first aircraft is of the ADS-B Out type.

Advantageously, the reception system of the second aircraft is of the ADS-B In type. Thus, the second aircraft is capable of receiving the ADS-B transmissions from the first aircraft.

Advantageously, the display characteristics of the alarm, such as its color, are parameterized according to the expected time of encountering the turbulence detected and its intensity.

Advantageously, the transmission system of the second aircraft is of the ADS-B Out type so as to transmit turbulence information to other aircraft.

BRIEF DESCRIPTION OF THE DRAWINGS

The invention will be more clearly understood and other advantages will become apparent on reading the detailed description in conjunction with the figures, in which.

DETAILED DESCRIPTION OF THE INVENTION

Figure 1:
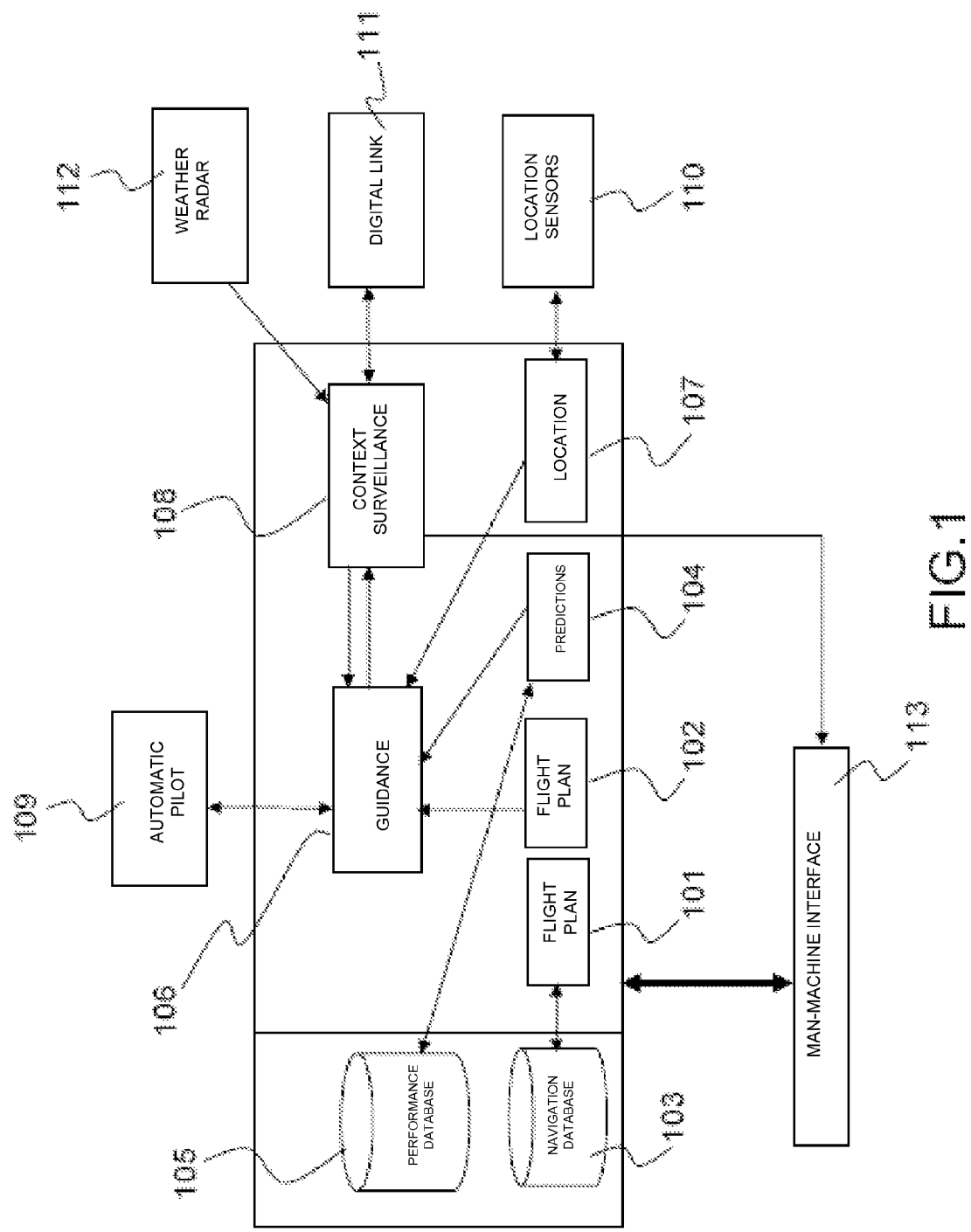
FIG. 1 shows one architecture of a flight management system according to the known art.

Surveillance of the context, and more particularly the detection, of turbulence is one of the functions proposed by a flight management system or FMS. In general, an FMS architecture, illustrated in FIG. 1, comprises a number of functions and a number of databases, such as context surveillance 108, guidance 106, predictions 104, especially as regards flight time and fuel consumption, flight plan 101, consisting of a series of points and segments connecting them, calculation of the flight path 102 from the elements of the flight plan and setpoints for monitoring the flight plan, and location 107. The set of databases includes in particular a navigation database 103 and a performance database 105 containing various characteristics and limits of the aircraft.

The FMS is interfaced with an automatic pilot 109, location sensors 110, a digital link 111 with other aircraft, called ADS-B (Automatic Dependent Surveillance Broadcast), and a weather radar 112. The ADS-B system allows airplanes to exchange information, especially about their position (longitude, latitude and altitude) and their speed. This system also makes it possible to exchange information relating to turbulence. The FMS may be controlled by a man-machine interface 113, which particularly includes screens and keyboards.

An illustrative example of the method according to the invention in the architecture presented makes it possible to benefit from the ADS-B link to supply the context surveillance function with information which, after analysis can raise an alarm in the event of turbulence.

The automatic turbulence detection method according to the invention is based on turbulence information transmitted by a first aircraft. This information is received and used by a second aircraft. If the first aircraft is located in the sector ahead of the second aircraft and if the information transmitted by the first aircraft indicates that it is in turbulence, then it is possible to deduce therefrom that the second aircraft will encounter this same turbulence and an alarm can be raised by the flight management system in order to alert the pilot. Two variants are possible for determining whether the first aircraft has encountered turbulence. In a first variant, the second aircraft analyzes the speed differences of the first aircraft. A large speed difference or small but rapid fluctuations may be used to deduce that the first aircraft is in turbulence. In a second variant, the first aircraft communicates directly with the second aircraft that it is in turbulence, by transmitting a specific signal. These two variants will be explained in detail in the following paragraphs.

According to the first variant of the invention, the automatic turbulence detection method comprises the following steps:
the transmission by at least a first aircraft of information about its position and its speed. The useful information is the following: a time stamp, its aircraft identifier (flight ID), a barometric altitude, its path (or track), its vertical speed (or altitude rate), its position (latitude and longitude), its true air speed and the wind speed;

the reception of the information by a second aircraft;

the measurement by the second aircraft of the variation in speed of the first aircraft in the vertical plane $\Delta Vz$ and in the horizontal plane $\Delta V$. The vertical speed variation is obtained from the altitude rate parameter of the first aircraft. The horizontal speed variation is obtained from the true air speed parameter of the first aircraft; and the comparison with maximum vertical and horizontal speed variation thresholds $\Delta Vz_{max}$ and $\Delta V_{max}$ and, if one of the thresholds is exceeded during a minimum confirmation time, the activation of an alarm proportional to the speed variation $\Delta Vz$ or $\Delta V$. The method raises an alarm as soon as the first aircraft has a speed that changes rapidly over time, both in the horizontal plane (a sign of wind turbulence and windshear) and in the vertical plane (turbulence). The wind speed parameter when it is provided, makes it possible to confirm the severity of the turbulence and to refine the reaction threshold associated with the turbulence.

According to a variant of the invention, the automatic turbulence detection method, which includes the calculation of a first speed difference $\Delta V_1$ from a first speed measurement $V_1$ taken at a first time $t_1$ and from a second speed measurement $V_2$ taken at a second time $t_2$, is noteworthy in that the alarm is activated after confirmation of said measurements, which comprises the following steps:

the comparison of the first speed difference $\Delta V_1$ with a threshold $\Delta V_{max}$;

the initiation of at least a third speed measurement $V_3$ at a third time $t_3$;

the calculation of at least a second speed difference $\Delta V_1'$ from the first speed measurement $V_1$ taken at the first time $t_1$ and from the third speed measurement $V_3$ at the third time $t_3$; and if the speed differences are above a threshold $\Delta V_{max}$, the activation of said alarm.

The times $t_1$, $t_2$ and $t_3$ are spaced apart by a few seconds. The objective of the third measurement is to confirm the difference obtained from the first two measurements and to prevent a measurement error caused by a signal jump.

Similarly, the method according to the invention can calculate acceleration differences, which are compared with acceleration thresholds $\gamma_{max}$. In this case, it is important to consider acceleration thresholds $\gamma_{max}$ greater than the accelerations commonly exerted during speed variations (acceleration or deceleration) when this is managed by the flight management system or the automatic pilot.

According to the second variant of the invention, the first aircraft transmits direct information about turbulence when it has detected or encountered turbulence. This direct information may take the form of a turbulence signal specifying its intensity (see also the RTCA DO252 and DO242A standards). The automatic turbulence detection method according to the invention then comprises the following steps:

the acquisition of information about turbulence detected or encountered by the first aircraft;

the transmission of said information by the first aircraft;

the reception of this information by a second aircraft; and the activation of an alarm by the second aircraft corresponding to said turbulence.

According to a variant of the invention, the transmission of information about turbulence by a first aircraft is carried out automatically.

According to a variant of the invention, the transmission of information about turbulence by a first aircraft is initiated manually by the pilot of said first aircraft.

According to a variant of the invention, the alarm includes information about the expected time of encountering the turbulence detected and about its intensity. In one exemplary embodiment, the alarm may adopt the following states:

"MED TURBULENCE IN XX MIN" if the detected turbulence is of medium strength;

"HIGH TURBULENCE IN XX MIN" if the detected turbulence is of high strength;

"WINDSHEAR IN XX MIN" in the event of windshear.

Figure 2:
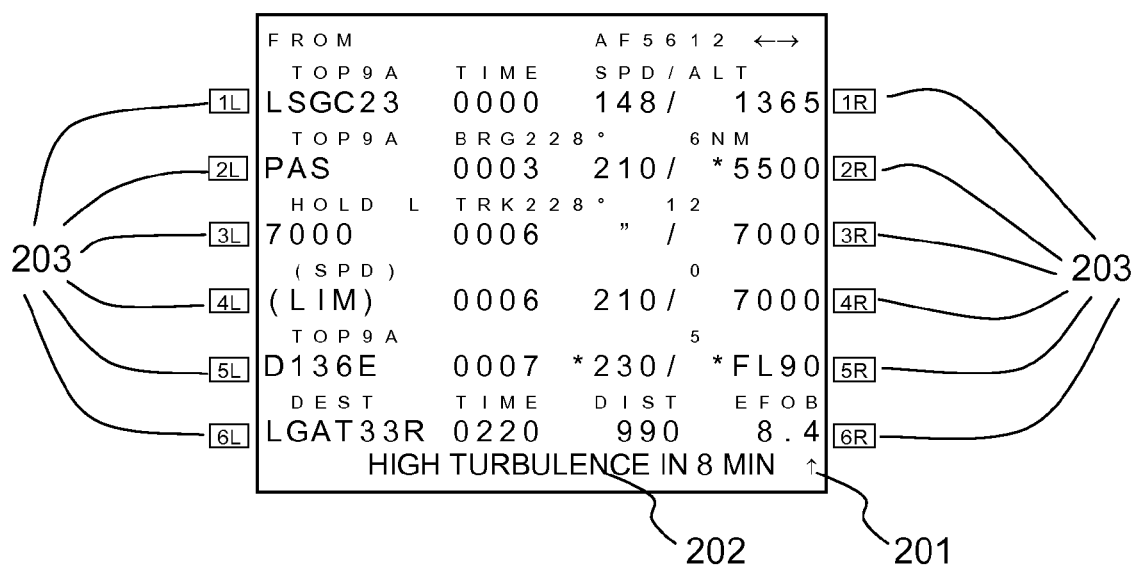
FIG. 2 shows an example of an alarm display on a man-machine interface of the flight management system using the automatic turbulence detection method according to the invention.

"XX MIN", which indicates the expected time of encountering the turbulence, will not be displayed if the turbulence is already present. FIG. 2 illustrates an example of an alarm display on a man-machine interface of the flight management system. The man-machine interface comprises a display means 201 and control knobs 203 distributed on either side of said display means. An element 202 (HIGH TURBULENCE IN 8 MIN) indicates that the aircraft will encounter turbulence of high intensity in eight minutes. The page displayed is a page of the flight plan, but it could be any other page since the alarm consists in displaying this message on the interface independently of the current page.

Advantageously, the display characteristics of the alarm, such as its color, are parameterized according to the expected time of encountering the detected turbulence and to its intensity. It is possible to associate a color with the alarms in order to differentiate them according to their degree of priority. Recognizing that it is considered that the time to react to an alarm and to reduce the speed is longer than thirty seconds, the following conventions may for example be adopted. The alarms announcing turbulence of high intensity with an expected time of encountering it of less than 1 minute are displayed in red. The color amber is used for alarms relating to turbulence of high intensity expected to be encountered between 1 and 8 minutes and for turbulence of medium intensity expected to be encountered in less than 3 minutes. White is associated with alarms for turbulence of high intensity located more than 8 minutes away and with alarms for turbulence of medium intensity expected to be encountered between 3 and 8 minutes. Turbulence of low intensity or turbulence of medium intensity expected to be encountered after more than 8 minutes does not involve an alarm or a display.

According to a variant of the invention, the information transmitted from the first aircraft to the second aircraft comprises the position, the altitude and the path of the first aircraft, and the method furthermore includes a step of analyzing said information by the second aircraft in order to determine whether it is liable to encounter the turbulence signaled by the first aircraft.

The second aircraft analyzes the turbulence information transmitted by the first aircraft only if the latter lies in the sector ahead of the second aircraft. In practice, it will be unnecessary for the second aircraft to analyze the data from aircraft that are far away (at a distance or with an altitude difference greater than a certain value) or have already passed (paths in opposite directions, whatever the distance or altitude. For example, only aircraft that are in front, at approximately the same altitude, for example a difference of less than 4000 feet, and a distance away of for example less than 120 Nm (nautical miles) can be considered. It is also possible to consider only aircraft lying within a cone, the apex of which is defined by the second aircraft and the angle of which is 30°.

The alarm may be confirmed in two ways. The first way consists in using, as time confirmer, continuous data (successive speed or acceleration measurements coming from the position and speed data received by ADS-B). Depending on the time period chosen, either acceleration data or speed data is used. Over very short periods, of less than one second, acceleration data is used—this choice provides better quality of the information but does require a larger bandwidth or a higher data rate—whereas for sampling over longer periods, of more than one second, speed data is used instead.

The second way, which is more direct, consists in waiting for the reception of a second message confirming the first as regards the turbulence information, for example generated manually by the pilot or produced automatically by a system on board the first aircraft.

The invention claimed is:

1. A method for automatic detection of turbulence by a second aircraft, based on information exchange between the second aircraft and a first aircraft, the first aircraft having encountered turbulence, said method comprising the steps of:
   transmitting by the first aircraft information including a speed and a position of the first aircraft;
   receiving said information by the second aircraft;
   analyzing said information by said second aircraft from the first aircraft, said analyzing including:
      measuring a speed variation $\Delta$ of said first aircraft; and
      comparing said speed variation $\Delta$ with a maximum speed variation threshold $\Delta_{max}$;
   deducing that said first aircraft is in said turbulence if said maximum speed variation threshold $\Delta_{max}$ is exceeded; and
   deducing that said second aircraft will encounter said turbulence encountered by the first aircraft, and activating an alarm proportional to said speed variation $\Delta$ if said first aircraft is located ahead said second aircraft.

2. The method as claimed in claim 1, wherein said analyzing further comprises analyzing by the second aircraft a horizontal speed of the first aircraft in order to detect turbulence.

3. The method as claimed in claim 1, wherein said analyzing further comprises analyzing by the second aircraft a vertical speed of the first aircraft in order to detect turbulence.

4. The method as claimed in claim 1, wherein said analyzing further comprises analyzing by the second aircraft horizontal and vertical speeds of the first aircraft in order to detect turbulence.

5. The method as claimed in claim 1, further comprising calculating a first horizontal speed difference $\Delta V_i$ in absolute value on the basis of a first horizontal speed measurement $V_i$ taken at a first time $t_i$, and of a second horizontal speed measurement $V_{i+1}$ taken at a second time $t_{i+i}$,
   wherein the alarm is activated after confirmation of said measurements, and said calculating includes the steps of:
   initiating at least a third horizontal speed measurement $V_{i+2}$ at a third time $t_{i+2}$;
   calculating at least a second speed difference $\Delta V_i'$ in absolute value on the basis of the first horizontal speed measurement $V_i$ taken at the first time $t_i$ and of the third horizontal speed measurement $V_{i+2}$ at the third time $t_{i+2}$,
   comparing the horizontal speed differences in absolute value with a threshold $\Delta V_{max}$; and
   activating the alarm if all the horizontal speed differences in absolute value are above the threshold $\Delta V_{max}$.

6. The method as claimed in claim 1, further comprising calculating a first vertical speed difference $\Delta Vz_i$ in absolute value on the basis of a first vertical speed measurement $Vz_i$ taken at a first time t, and of a second vertical speed measurement $Vz_{i+i}$ taken at a second time $t_{i+i}$,
   wherein the alarm is activated after confirmation of said measurements, and said calculating includes the steps of:
   initiating at least a third vertical speed measurement $Vz_{i+2}$ at a third time $t_{i+2}$;
   calculating at least a second vertical speed difference $\Delta Vz_i'$ in absolute value on the basis of the first vertical speed measurement $Vz_i$ taken at the first time $t_i$ and of the third vertical speed measurement $Vz_{i+2}$ at the third time $t_{i+2}$,
   comparing the vertical speed differences in absolute value with a threshold $\Delta Vz_{max}$; and
   activating the alarm if all the vertical speed differences $\Delta Vz_i'$ in absolute value are above the threshold $\Delta Vz_{max}$.

7. The method as claimed in claim 1, further comprising calculating a first rms (root means square) speed difference $\Delta Vq_i$ from a first measurement of the horizontal speed $V_i$ and vertical speed $Vz_i$ taken at a first time t, and from a second measurement of the horizontal speed $V_{i+1}$ and vertical speed $Vz_{i+1}$ taken at a second time $t_{i+1}$,
   wherein the alarm is activated after confirmation of said measurements, and said calculating includes the steps of:
   calculating the first rms speed difference $\Delta Vq_i$, said first rms difference satisfying the following equation:
   $$\Delta Vq_i = \sqrt{(V_{i+1}-V_i)^2 + (Vz_{i+1}-Vz_i)^2},$$
   initiating at least a third measurement of the horizontal speed $V_{i+2}$ and vertical speed $Vz_{i+2}$ at a third time $t_{i+2}$;
   calculating at least a second rms speed difference $\Delta Vq_i'$ from the first measurement of the horizontal speed $V_i$ and vertical speed $Vz_i$ taken at the first time $t_i$ and from the third measurement of the horizontal speed $V_{i+2}$ and vertical speed $Vz_{2+2}$ at the third time $t_{i+2}$, said second rms difference satisfying the following equation:
   $$\Delta Vq_i' = \sqrt{(V_{i+2}-V_i)^2 + (Vz_{i+2}-Vz_i)^2},$$
   comparing the rms speed differences with a threshold $\Delta Vq_{max}$; and
   activating the alarm if the rms speed differences are above the threshold $\Delta Vq_{max}$.

8. The method as claimed in claim 1, further comprising calculating a first horizontal acceleration difference $\gamma_i$ from a first horizontal speed measurement $V_i$ taken at a first time $t_i$ and from a second horizontal speed measurement $V_{i+1}$ taken at a second time $t_{i+1}$,
   wherein the alarm is activated after confirmation of said measurements, and said calculating includes the steps of:
   calculating the first horizontal acceleration difference $\gamma_i$ said first difference satisfying the following equation:
   $$\gamma_i = (V_{i+1}-V_i)/(t_{i+1}-t_i),$$
   initiating at least a third horizontal speed measurement $V_{i+2}$ at a third time $t_{i+2}$;
   calculating at least a second horizontal acceleration difference $\gamma_i'$ from the first horizontal speed measurement $V_i$ taken at the first time $t_i$ and from the third horizontal speed measurement $V_{i+2}$ at the third time $t_{i+2}$, said second difference satisfying the following equation:
   $$\gamma_i' = (V_{i+2}-V_i)/(t_{i+2}-t_i),$$
   comparing the horizontal acceleration differences with an acceleration threshold $\gamma_{max}$; and
   activating the alarm if the horizontal acceleration differences are above the acceleration threshold $\gamma_{max}$.

9. The method as claimed in claim 1, further comprising calculating a first vertical acceleration difference $\gamma_i$ from a first vertical speed measurement $Vz_i$ taken at a first time $t_i$ and from a second vertical speed measurement $Vz_{i+1}$ taken at a second time $t_{i+1}$, wherein the alarm is activated after confirmation of said measurements, and the calculating includes the steps of:

calculating the first vertical acceleration difference $\gamma_i$, said first difference satisfying the following equation:

$$\gamma_i = (Vz_{i+1} - Vz_i)/(t_{i+1} - t_i),$$

initiating at least a third vertical speed measurement $Vz_{i+2}$ at a third time $t_{i+2}$;

calculating at least a second vertical acceleration difference $\gamma_i'$ from the first vertical speed measurement $Vz_i$ taken at the first time $t_i$ and from the third vertical speed measurement $Vz_{i+2}$ at the third time $t_{i+2}$, said second difference satisfying the following equation:

$$\gamma_i' = (Vz_{i+2} - Vz_i)/(t_{i+2} - t_i),$$

comparing the vertical acceleration differences with an acceleration threshold $\gamma_{max}$; and activating the alarm if the vertical acceleration differences are above the acceleration threshold $\gamma_{max}$.

10. The method as claimed in claim 1, further comprising calculating a first rms acceleration difference $\gamma q_i$ from a first measurement of the horizontal speed $V_i$ and vertical speed $Vz_i$ taken at a first time $t_i$ and from a second measurement of the horizontal speed $V_{i+1}$ and vertical speed $Vz_{i+1}$ taken at a second time $t_{i+1}$, wherein the alarm is activated after confirmation of said measurements, and said calculating includes the steps of:

calculating the first rms acceleration difference $\gamma q_i$, said first rms acceleration difference satisfying the following equation:

$$\gamma q_i = \frac{\sqrt{(V_{i+1} - V_i)^2 + (Vz_{i+1} - Vz_i)^2}}{(t_{i+1} - t_i)},$$

initiating at least a third measurement of the horizontal speed $V_{i+2}$ and vertical speed $Vz_{i+2}$ at a third time $t_{i+2}$;

calculating at least a second rms acceleration difference $\gamma q_i'$ from the first measurement of the horizontal speed $V_i$ and vertical speed $Vz_i$ taken at the first time $t_i$ and from the third measurement of the horizontal speed $V_{i+2}$ and vertical speed $Vz_{i+2}$ at the third time $t_{i+2}$, said second rms acceleration difference satisfying the following equation:

$$\gamma q_i' = \frac{\sqrt{(V_{i+2} - V_i)^2 + (Vz_{i+2} - Vz_i)^2}}{(t_{i+2} - t_i)},$$

comparing the rms acceleration differences with a threshold $\gamma q_{max}$, and activating the alarm if the rms acceleration differences are above the threshold $\gamma q_{max}$.

11. The method as claimed in claim 1, further comprising a step of inhibiting the alarm.

12. The method as claimed in claim 11, wherein the step of inhibiting the alarm is initiated if the airplane is already in a flight configuration appropriate to flight under turbulent conditions.

13. The method as claimed in claim 11, wherein the step of inhibiting the alarm is initiated manually by the pilot.

14. The method as claimed in claim 1, wherein the alarm includes information including an expected time of encountering the turbulence detected and its intensity.

15. The method as claimed in claim 1, wherein the information transmitted from the first aircraft to the second aircraft further include altitude and path of the first aircraft, and wherein said step of analyzing said information by the second aircraft is to determine whether the latter is liable to encounter the turbulence signaled by the first aircraft and to reject the turbulence information coming from the first aircraft if the latter lies beyond the short-term horizon of the second aircraft.

16. An automatic turbulence detection device for implementing the method as claimed in claim 1, comprising an acquisition unit, an analysis unit, an alarm unit and a man-machine interface which includes a display means and control knobs placed on either side of said display unit, wherein said man-machine interface includes for a unit configured for signaling that turbulence has been detected.

17. The automatic turbulence detection device as claimed in claim 16, further comprising a transmission system of the first aircraft which is an ADS-B Out type.

18. The automatic turbulence detection device as claimed in claim 17, further comprising a reception system of the second aircraft which is an ADS-B In type.

19. The automatic turbulence detection device as claimed in claim 18, further comprising a transmission system of the second aircraft which is an ADS-B Out type so as to transmit turbulence information to another aircraft.

20. The automatic turbulence detection device as claimed in claim 16, wherein display characteristics of the alarm are parameterized according to an expected time of encountering the turbulence detected and its intensity.

* * * * *